Figure 1:
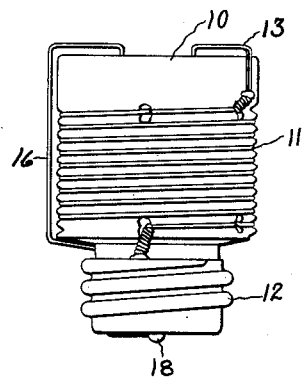

March 21, 1933. C. STEENSTRUP 1,902,470

VOLTAGE COMPENSATED MOTOR STARTER

Filed March 25, 1930

Inventor:
Christian Steenstrup,
by Charles E. Mullen
His Attorney.

Patented Mar. 21, 1933

1,902,470

UNITED STATES PATENT OFFICE

CHRISTIAN STEENSTRUP, OF SCHENECTADY, NEW YORK, ASSIGNOR TO GENERAL ELECTRIC COMPANY, A CORPORATION OF NEW YORK

VOLTAGE COMPENSATED MOTOR STARTER

Application filed March 25, 1930. Serial No. 438,858.

My invention relates to a motor controlling device, more particularly a controlling device for a split phase alternating current motor.

In household electric refrigerators, an alternating current motor of the split phase type is commonly used to drive the compressor for the refrigerating coils. Upon starting, the motor takes a heavy current to develop enough torque to start after which the current rapidly decreases as the motor comes up to speed.

One method of starting a split phase motor is to employ a a resistor in series with the starting winding to "split the phase". The purpose of introducing a resistor in series with the starting winding is to produce a phase angle relationship in the currents flowing through the starting winding and the running winding to produce a revolving field which results in a torque acting upon the rotor of the motor. The higher the resistance the greater the phase angle difference which is a desirable condition. However, with an increase in the resistance, the amount of current which is permitted to flow through the starting winding is thereby reduced so that a practical value must be selected for the resistor such that sufficient current flows through the starting winding to provide the necessary torque to start the motor. Of course, it will be understood that as the applied voltage is increased, the phase splitting resistor may also be increased and still permit sufficient current to flow through the starting winding to produce a starting torque. Again the resistance must not be so low as to permit excessive current to flow through the windings, which of course is undesirable.

In the various refrigerator installations many different voltages are encountered ranging usually from 90 to 125 volts. It will be apparent therefore, that a problem of starting a split phase motor is introduced. It will be readily seen that if a phase splitting current limiting means is inserted in the motor circuit, which is designed to permit enough starting current to flow to develop a starting torque at 90 volts with the higher voltages, the starting current will be excessive and far greater than necessary to provide a starting torque; whereas, if the phase splitting current limiting means is designed suitable for higher voltages, insufficient current will flow at the low voltages to start the motor.

A compromise has therefore been necessary, which is not satisfactory and power companies have objected to flickering of electric lights caused by a sudden load change in excess of 15 amperes which frequently results upon starting a split phase motor of this type. Some means therefore, is necessary for splitting the phase and at the same time for limiting the current flowing to the motor over the wide range of voltages encountered in the refrigerator installations.

It is the principal object of my invention to provide means for splitting the phase which will always limit the motor starting current below the desired maximum but will also permit sufficient current to flow to start the motor over a wide range of voltages.

Other objects will appear hereinafter.

In the preferred embodiment of my invention, a self-reducing resistor is used with a split phase motor provided with a running winding and a starting winding. A suitable thermostatically operated switch mechanism places the motor running winding across the lines. In series with the running winding is an electroresponsive switch which upon energization of the running winding closes a circuit through the starting winding of the split phase motor. In series with the starting winding is the automatic phase splitting self-reducing resistor. This self-reducing resistor is so designed that in the case of high voltages or normal voltages a sufficient current is permitted to flow through the starting winding to start the motor but at the same time the initial inrush of current in the circuit is limited to the minimum required to start the motor which with this resistor will be below 15 amperes. In the case of the application of low voltages, if insufficient current is permitted to flow through the starting winding, the automatic resistor heats up thereby reducing the amount of resistance placed in the starting winding circuit. When the resistor reaches such a value that sufficient current is permitted to flow through the starting winding, the motor will then start up.

Figure 2:
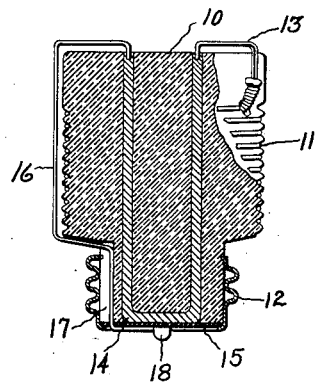
Figure 3:
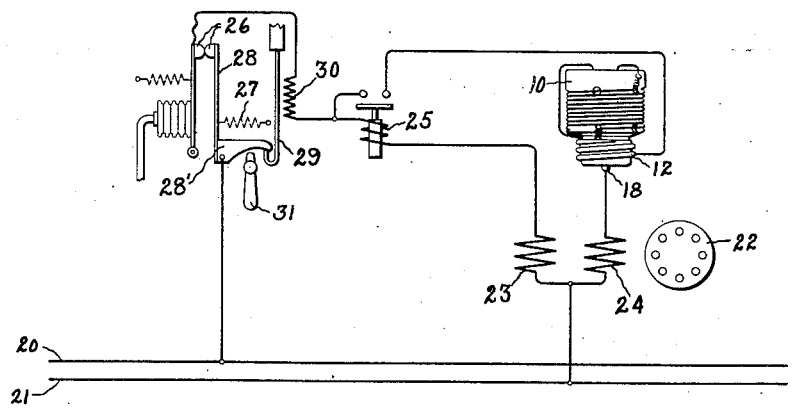

Fig. 1 is a side view of a self-reducing resistor used in my control device; Fig. 2 is a cross section thereof; Fig. 3 shows an application of my invention to a motor circuit.

Referring to Fig. 1, it will be seen that the resistor is so constructed that it may be screwed into a base. The resistor consists of a base 10 of insulating material provided with grooves therein in which is wound the resistor element 11. The base of the resistor is provided with the screw member 12 which will fit a screw socket similar to a lamp socket.

Referring to Fig. 2, it will be seen that the resistor 10 has provided therein a U-shaped passageway which is filled with a self-reducing resistor material such for example as tellurium. This self-reducing resistor element 14 is connected in series with the other resistance 11 by means of the member 13. The other end of the resistor 11 is connected to the screw threaded member 12, as shown in Fig. 1. Connected to the button member 18 and insulated from the resistor 14 by means of the insulating element 15 is the element 16 connected to the other end of the resistor 14. A slot 17 in the member 10 permits the element 16 to pass by the screw member 12 without contact therewith. The resistor unit just described is disclosed and claimed in Patent No. 1,879,253, of September 27, 1932, to E. H. Horstkotte, which patent was assigned to the same assignee as the present application.

Referring to Fig. 3, it will be seen that the self-reducing resistor is connected in series with the starting winding 24 of the split phase motor. The running winding 23 and the starting winding 24 energize the rotor 22 of the split phase motor. Connected in series with the running winding 23 is the electroresponsive means 25 which responds to a current flowing through the running winding to connect the starting winding across the line. A thermostatic switch provided with the contacts 26 operates in response to temperature changes to place the motor across the lines 20 and 21. The thermostatic switch is provided with the overload heater element 30 and the heat responsive element 29 which upon overload conditions assumes a curved shape releasing the arm 28' which permits the spring 27 to pivot the pivoted arm 28 to open contacts 26. The manually operated member 31 is for the purpose of opening up the switch or placing it under the control of the heat responsive element 29. This switch is described and claimed in the Hutt Patent No. 1,637,042.

The operation of the device is as follows: Upon closure of the thermostatic switch mechanism 26 to start the motor, the inward rush of current through the running winding 23 closes the starting relay 25 thereby energizing the starting winding 24 through the self-reducing resistor 14. The particular function of the self-reducing resistor in this service is to compensate for variation in the line voltages. Thus, with normal or high voltage the self-reducing resistor serves to limit the current supplied to the starting winding to a permissible value.

In case of low voltages such that the motor does not readily start with the limited current through the starting winding, the self-reducing resistor automatically decreases its resistance due to the heating effect of the current flowing therethrough until sufficient current is obtained to insure starting of the motor. This automatic reduction of the resistor occurs before the thermal overload element 30 has had time to function. Thus, with the self-reducing resistor of the present invention, the starting of the refrigerator motor is insured under all voltage conditions and at the same time excessive starting current on normal or high voltages is effectively avoided.

The embodiment of the invention illustrated and described herein has been selected for the purpose of clearly setting forth the principles involved. It will be apparent, however, that the invention is susceptible of being modified to meet the different conditions encountered in its use and I, therefore, aim to cover by the appended claims all of the modifications within the true spirit and scope of my invention.

What I claim as new and desire to secure by Letters Patent of the United States, is:

1. In combination a split phase motor having a running winding and a starting winding, electroresponsive means in series with said running winding and controlled by the current therethrough for controlling energization of said starting winding, a resistor unit comprising a fixed resistance and a self reducing variable resistance for splitting the phase to start the motor and limiting the current through said starting winding, said resistor decreasing its impedance on low voltage to permit sufficient current to start the motor and thermostatic switch means for energizing said motor.

2. In combination, a split phase motor having a running winding and a starting winding, automatic means responsive to the current in the running winding for controlling the energization of the starting winding and a resistor unit comprising a fixed resistance and a self-reducing variable resistance in circuit with the starting winding for splitting the phase to start said motor and for limiting the initial current in the starting winding below a predetermined value when a relatively high voltage is applied to the motor and adapted to be heated by the stalled current when a low voltage is applied to the motor whereby its resistance is reduced to permit sufficient current to pass through said starting winding to start the motor.

3. In a motor control circuit, a split phase motor provided with a running winding and a starting winding, switch mechanism for applying voltage to the motor, means for placing said starting winding in parallel with said running winding while the motor is being started and for opening the circuit through the starting winding when the motor attains running speed, and a resistor unit having a fixed resistance and a self-reducing variable resistance in series with said starting winding for splitting the phase and to limit the starting current of said motor below a predetermined maximum.

4. In combination, a split phase motor having a running winding and a starting winding, a resistor unit comprising a fixed resistance and a self reducing variable resistance for splitting the phase to start said motor and for limiting the starting current through said starting winding over a wide range of applied voltages, an electro-responsively controlled means for energizing said starting winding to start the motor and controlled by the current through said running winding, and means for energizing said running winding and said electro-responsively controlled means.

5. In a motor control circuit, a split phase motor having a running winding and a starting winding, electro-responsive means controlled by the current through said running winding for energizing said starting winding, a resistor unit comprising a fixed resistance and a self reducing variable resistance for splitting the phase to start the motor and for limiting the flow of starting current to a predetermined maximum.

6. In a refrigerating apparatus, a motor having a running winding and a starting winding, a resistor unit comprising a fixed resistance and a self reducing variable resistance in series with said starting winding and operable over a wide range of voltages to split the phase to start the motor and to limit the starting current through said winding, an electro-responsive means connected in series with said running winding and responsive to a current therethrough for energizing said starting winding, and a thermostatic switch means for energizing said running winding and said electro-responsive means.

7. In combination, a split-phase motor having a starting winding and running winding, a resistor unit comprising a fixed resistance and a self reducing variable resistance for splitting the phase to start the motor and operable over a wide range of voltages in series with said starting winding, an electro-responsive device in series with said running winding and responsive to a flow of current through said running winding to connect said starting winding and running winding in parallel upon starting said motor, a thermostatic switch means for energizing said motor, and an overload device for opening said switch on overload conditions, said self reducing resistance of said resistor unit in response to heating decreasing in resistance whereby said resistor unit normally operates to start said motor on low voltages before said overload device responds to open said switch.

In witness whereof, I have hereunto set my hand this 24th day of March, 1930.

CHRISTIAN STEENSTRUP.